May 6, 1952     A. C. HOWARD     2,595,854
GARDEN TRACTOR TILLER TRANSMISSION

Filed Feb. 6, 1947     3 Sheets-Sheet 1

INVENTOR.
Arthur C. Howard
BY
Mawhinney & Mawhinney
Attorneys

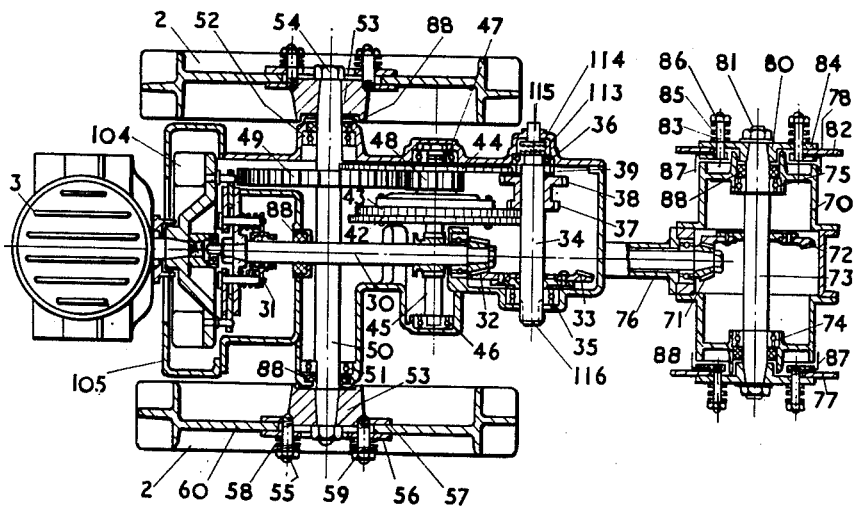

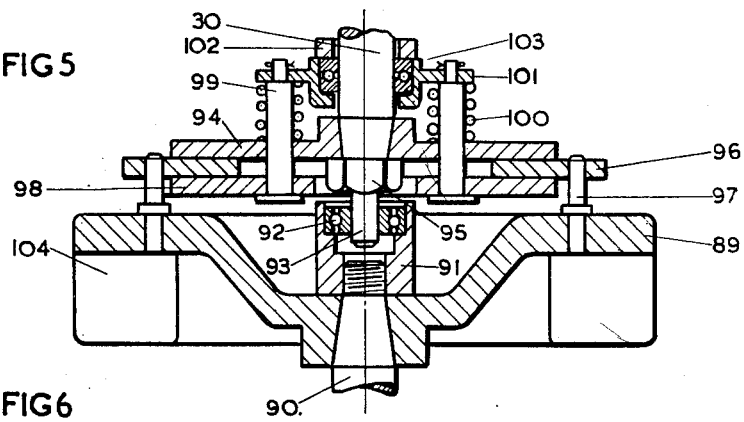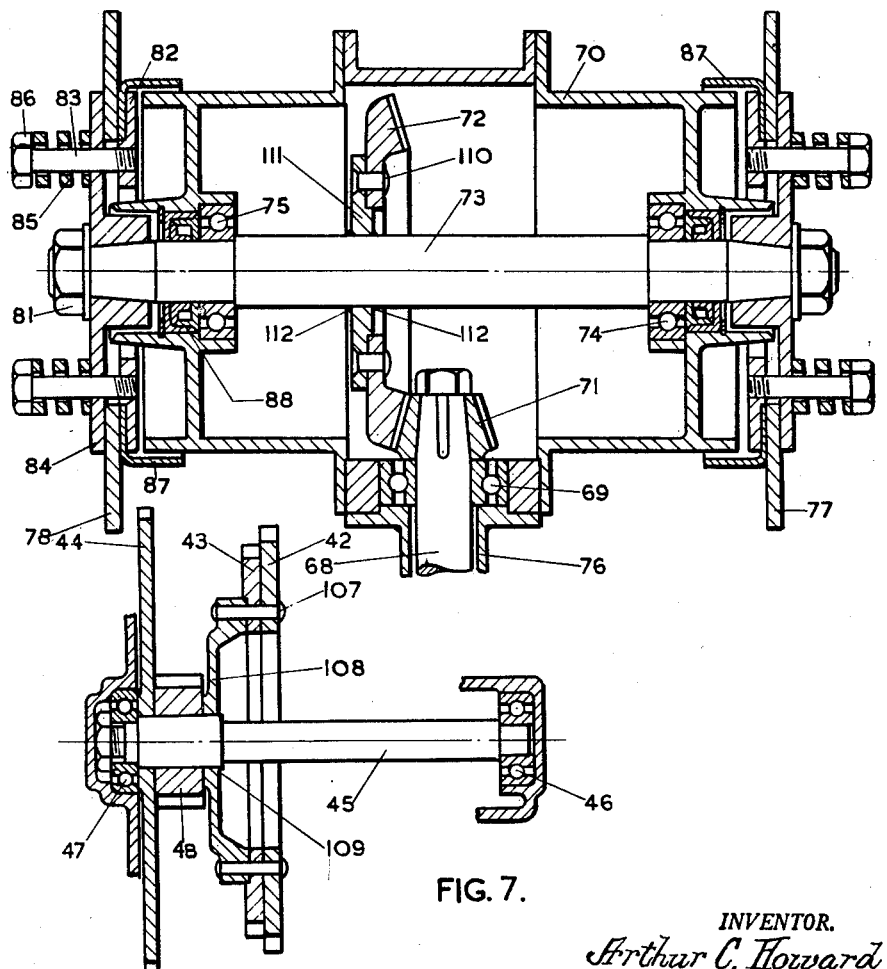

Patented May 6, 1952

2,595,854

UNITED STATES PATENT OFFICE 2,595,854

GARDEN TRACTOR TILLER TRANSMISSION

Arthur Clifford Howard, Leeds, England, assignor to Rotary Hoes Limited, East Horndon, Essex, England Application February 6, 1947, Serial No. 726,922
In Great Britain February 25, 1941

Section 1, Public Law 690, August 8, 1946
Patent expires February 25, 1961

1 Claim. (Cl. 97—40)

This invention relates to agricultural machines of the type comprising a pair of motor-driven road wheels; a motor driven rotor provided with one or more circumferentially projecting hoes or other tilling implements; a supporting wheel or skid whose position may be adjusted to control the depth of operation of the hoes in the soil and gearing connecting said road wheels and rotor with a suitably supported motor in such a manner that the speed of the road wheels is related to that of the rotor in such ratios that the rotor tends to over-take the road wheels which latter are provided with means of gripping the ground so that they function as travelling anchorages to support the forward thrust of the former.

It is the object of the present invention to provide an improved agricultural machine of the type set forth in which the ratio of the road wheel speed to the rotor speed can be changed, and in which the road wheel and rotor drives together with the necessary gearing are arranged in a simple and compact manner.

According to the present invention, an agricultural machine of the type set forth having an enclosed gear casing containing the gearing through which the road wheels and rotor shaft are driven, and a rotor shaft casing connected thereto and containing a rotor shaft, comprises an engine and clutch at the front of the gear casing, a longitudinal drive shaft which drives a transverse jack shaft through bevel gearing, a transverse lay shaft adapted to be driven by said jack shaft through change-speed gearing, gearing connecting said lay shaft with the road wheel axle, and a drive from said longitudinal shaft to the rotor shaft.

According to an important feature of the present invention the rotor of a rotary tilling machine is provided with a direct shaft drive intermediate its ends and the tilling implements are operatively connected in two circumferential sets of one or more rows to the opposite ends of the rotor shaft by separate friction clutches. The rotor shaft and the driving shaft are enclosed by casings and the sets of tilling implements are connected to the ends of the rotor shaft which project beyond the casing.

In some cases the driving shaft is formed in two separable parts operatively connected together and the rotor together with the outer portion of the driving shaft may be removed so that the inner portion of said shaft may be employed to drive a mowing machine or other agricultural implement, or alternatively with the road wheel drive in neutral be employed as a power take-off shaft for other purposes.

According to another important feature of this invention, the rotor drive shaft is driven from the motor shaft at a slight angle by a parallel sliding spur pinion on the motor shaft engaging with an oblique spur gear on the rotor drive shaft. By this means the employment of bevel gearing to take into account the angle between the two shafts is avoided and a smoother drive which is cheaper to produce is obtained.

In order that the present invention may be clearly understood it will now be more particularly described with reference to the accompanying drawings, which illustrate one embodiment thereof. In these drawings:

Figure 3 is a horizontal sectional view;

Figure 4 is a vertical sectional view;

Figure 5 is an enlarged sectional detail view of the clutch;

Figure 6 is an enlarged sectional detail view of the rotor; and

Figure 7 is an enlarged view of the lay-shaft showing one method of forming the gears.

Figure 1:
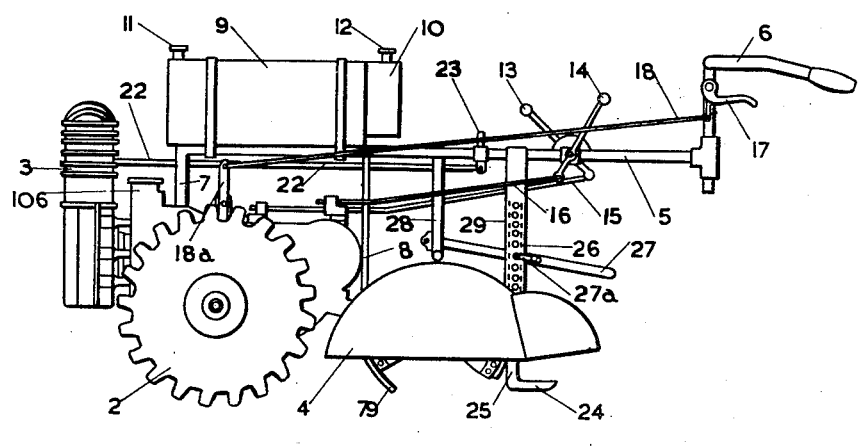
Figure 1 is a side elevation.
Figure 2:
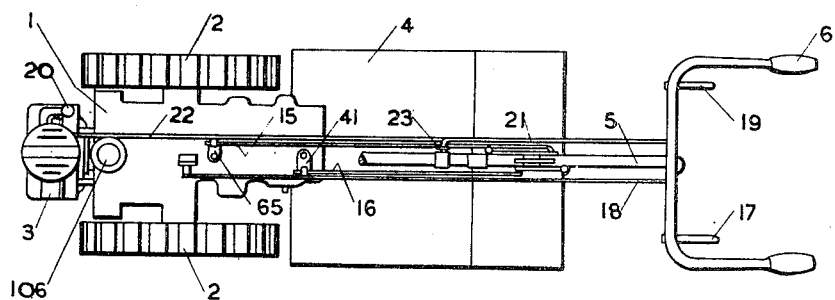
Figure 2 is a plan with parts broken away to expose the controls.

Referring now to Figures 1 and 2 of the drawings, the rotary hoe of my invention comprises a gear casing 1, supported by road wheels 2, and carrying a petrol engine 3. A rotor surmounted by a shield 4 is connected to the rear of the casing 1, and a control bar 5 terminating at the rear in a pair of handle-bars 6, is secured by stanchions 7 and 8 to the top of the said gear casing. A petrol tank 9 and an oil tank 10 provided respectively with filler caps 11 and 12 are secured to the control bar, and two gear levers 13 and 14 which respectively are adapted to operate slidable gears on a longitudinal shaft and a jack-shaft, as hereinafter described, through rods 15 and 16 are pivoted to the control bar. A lever 17 adapted to operate a clutch through a rod 18, a reversing lever 18a pivoted to a bracket on the frame, and an adjustable push-rod 18b (see Figure 4), are mounted adjacent to the left-hand handle-bar, and a similar lever 19 mounted adjacent to the right-hand handle-bar is adapted to operate the throttle of the carburettor 20 through rods 21 and 22, and the reversing lever 23 pivoted to the control bar. The rotary hoe is provided with a depth control skid 24 at the foot of a vertical shaft 25 received in a tube 26 which is secured to the control bar. A depth control lever 27 pivoted to the main support 28 for the shield carries a pin which is connected to the depth control shaft through a slot 29 in one side of the tube 26, and the skid can be locked in an adjusted position by a spring-loaded clip 27a having a pin for alternative engagement with any one of a series of holes in the opposite side of the tube 26.

Referring now to Figures 3 and 4, the engine 3 drives the longitudinal shaft 30 through a clutch indicated generally at 31 and described hereinafter with reference to Figure 5. The shaft 30 carries a bevel pinion 32 at its inner end in constant mesh with a bevel wheel 33 secured to the jack-shaft 34. The jack-shaft is supported in ball bearings 35 and 36 in the sides of the gear casing, and has three sliding pinions 37, 38 and 39 splined to it. These pinions are formed as a unit incorporating an annular groove for engagement by a gear shifting fork 40 whose position is controlled by the gear lever 14 and rod 16 through the arm 41.

The pinions 37, 38 and 39 are respectively adapted to be slid selectively into and out of engagement with the gear wheels 42, 43 or 44, fast on the lay-shaft 45 which is supported in ball bearings 46 and 47 in the sides of the casing 1. The lay-shaft 45 has a pinion 48 fixed to it and permanently in mesh with a gear wheel 49 fixed on the road wheel axle 50. The road wheel axle 50 is supported in ball bearings 51 and 52 in the sides of the casing 1 and carries friction clutches at its ends through which it transmits the drive to the road wheels 2.

These clutches each comprise a hub member 53 held by a nut 54 on to a coned end portion of the axle. The hub 53 is provided with studs 55 which pass through a ring 56 which is urged towards a flange 57 on the hub by springs 58 and nuts 59 on the studs. Each road wheel has a central plate 60 with a concentric aperture the peripheral portion of which is gripped between the ring 56 and the flange 57. The grip of the clutch is adjusted by turning the nuts 59.

The longitudinal shaft 30 carries a parallel-sided spur pinion 61 on splines. This pinion is adapted to be slid into or out of engagement with an oblique spur wheel 68 fixed to the downwardly inclined shaft 63 by which the rotor is driven. The pinion 61 is slid on the shaft 30 by a fork 64 which is controlled by the gear lever 13 and rod 15, through the arm 65. The downwardly inclined shaft 63 is connected by an internally splined sleeve 66 supported in a ball bearing 67, with a coaxial shaft 68 which is supported in the ball bearing 69 within the rotor shaft casing 70 and carries a bevel pinion 71, permanently in mesh with a bevel wheel 72 on the rotor shaft 73.

The rotor shaft 73—see Figure 6—is supported in ball bearings 74 and 75 in the ends of the rotor shaft casing 70 and the latter is detachably connected to the gear casing 1 by a tube 76 through which the shaft 68 passes. A friction clutch is carried at each end of the rotor shaft 73 for transmitting drive to the two discs 77 and 78 which carry the earth working tools 79 (see Figure 1). These clutches are similar in construction to those described above through which the road wheels are driven, and each comprises a hub member so held by a nut 81 on to a coned portion of the rotor shaft. A ring 82 having studs 83 which pass through holes in a flange 84 on the hub 80, is urged towards said flange by springs 85 and nuts 86. The discs 77 and 78 are gripped between the respective rings 82 and flanges 84 so as to be driven by the rotor shaft. The gripping effect of these clutches is controlled by turning the nuts 86.

It will be seen that the whole apparatus is totally enclosed so as to protect the mechanism from the ingress of dust, water, or other foreign matter which would damage it, and to this end a baffle 87 is gripped by each of the clutches on the rotor shaft. Also, and with the added purpose of retaining lubricant, the ends of the rotor shaft 73 and of the road wheel shaft 50, and the portion of the longitudinal shaft 30 that passes into the casing 1 are provided with gland packings 88.

The engine clutch, see Figure 5, comprises a driving disc 89 held on the engine shaft 90 by a housing 91 screwed on the latter. The housing 91 contains a ball bearing 92 which supports a forward projection 93 of reduced diameter of the longitudinal shaft 30. The shaft 30 has a driven clutch plate 94 secured to it by the nut 95, and the driving disc 89 supports a driving clutch ring 96 on pegs 97. A driven clutch ring 98 carries headed pins 99 which pass through holes in the clutch plate 94 and after passing through the clutch springs 100 have their ends anchored by split pins in a flange 101 on the clutch thrust bearing housing. The ring 96 is normally gripped between the ring 98 and plate 94 so as to enable drive to be communicated from the engine to the shaft 30.

The clutch is disengaged by a lever 102, see Figure 4, pivoted at its lower end to the casing 1 and connected at its top to the push rod 18. This lever when the lever 17 on the handle-bar is operated to disengage the clutch, bears on the thrust bearing housing 103 of the clutch and compresses the springs 100 so as to cause the ring 98 and plate 94 to release the driving ring 96.

The driving disc 89 is provided with blades 104 and rotates within a housing 105 terminating in a throat 106 so as to create a cooling draught for the engine.

For ease of manufacture, some of the gear wheels are made in the form of toothed rings which are riveted to discs welded to the appropriate shafts. An example of this form of construction is illustrated in Figure 7 where the gear wheels 42 and 43 are riveted at 107 to a disc 108 welded at 109 to the lay-shaft 45. Similarly, in Figure 6, the bevel wheel 72 is shown riveted at 110 to the disc 111 welded at 112 to the rotor shaft 73.

The jack shaft 34 embodies a dog clutch member 113, see Figure 3, adapted to be engaged by a co-operating dog clutch member 114 when a starting handle with a squared shank is entered into a squared recess in the projecting member 115 attached to the dog clutch member 114. The opposite end of the jack shaft may also project at 116 from the casing 1 and be squared, fluted, or otherwise adapted to act as a power take-off shaft.

The tube 76 which supports the rotor shaft casing 70 is detachably secured to the gear casing 1 by bolts 117 which pass through a flange 118 on said tube. The rotor can therefore be detached and substituted by other agricultural apparatus adapted to be driven by a shaft such as 63.

In use, the gear lever 14 is moved to control the three-speed gear drive to the road wheels, into and out of operation. The clutch is operated by the lever 17 to permit these gear movements to be made, and the throttle is controlled by the lever 19. The depth of tilth is controlled by setting the lever 27 in a position to adjust the elevation of the skid 24 to the desired degree.

According to a modified construction, a rotor may be driven from one end by a train of gearing or a chain and sprockets accommodated within a casing which is attached by a sleeve to the casing 1 around the take-off end 116 of the jack shaft 34. A dog clutch is arranged between the jack shaft and the shaft of the driving pinion of the gear train or the driving sprocket of the chain drive. With this construction, the shaft 63 may be employed as a power take-off shaft or for driving other agricultural implements or it can together with the spur gears 61 and 62 be omitted.

The above constructions have been described for the purpose of illustration only and it is intended that modifications may be made therein without departing from the scope of the present invention as defined by the claim.

What I claim as my invention and desire to secure by Letters Patent of the United States is:

A rotary tilling machine comprising a frame, a motor carried by said frame and having a driving shaft, a gear transmission casing carried by the frame rearwardly of the motor, a longitudinal power shaft supported for rotation in said gear transmission casing, clutch means connecting one end of said power shaft to said driving shaft, a jack shaft journaled for rotation in the casing rearwardly and transversely of the other end of the power shaft, drive means connecting said jack shaft to said power shaft, a lay shaft journaled for rotation in said casing forwardly of the jack shaft and having its axis substantially parallel to said jack shaft, said lay shaft transversely underlying the longitudinal shaft, a plurality of drive gears secured to said lay shaft, a plurality of axially slidable change-speed pinions on said jack shaft for selective engagement with said plurality of drive gears carried by said lay shaft, a ground wheel axle journaled for rotation in said gear casing forwardly of said lay shaft and having its axis substantially parallel to the axes of said jack and lay shafts, drive means between said ground wheel axle and said lay shaft, a rearwardly declined longitudinal rotor driving shaft rotatably journaled in and extending from said casing beneath said jack shaft, a rotor shaft disposed transversely of and drivingly connected to the outer end of the rotor driving shaft, a conical spur gear secured to said declined rotor driving shaft within the casing, a plain spur gear splined on said longitudinal power shaft at a location between said lay shaft and wheel axle for axial movement therealong and being positioned to selectively engage and disengage said conical spur gear for driving said declined rotor driving shaft and means supported on said gear casing and connected to said plain spur gear for moving said plain spur gear and thereby selectively engaging and disengaging said declined rotor driving shaft with said longitudinal power shaft.

ARTHUR CLIFFORD HOWARD.

REFERENCES CITED

The following references are of record in the file of this patent:

UNITED STATES PATENTS

| Number | Name | Date |
|---|---|---|
| 1,290,475 | Allen | Jan. 7, 1919 |
| 1,294,317 | Staude et al. | Feb. 11, 1919 |
| 1,342,977 | Thompson | June 8, 1920 |
| 1,382,278 | Foote | June 21, 1921 |
| 1,506,755 | Keim | Sept. 2, 1924 |
| 2,214,702 | Seaman | Sept. 10, 1940 |
| 2,287,479 | Kelsey | June 23, 1942 |
| 2,303,738 | Harrison | Dec. 1, 1942 |
| 2,306,902 | Rabe | Dec. 29, 1942 |
| 2,366,626 | Kelsey | Jan. 2, 1945 |